(12) United States Patent
Talty et al.

(10) Patent No.: US 10,284,387 B2
(45) Date of Patent: May 7, 2019

(54) HYBRID INTRA-VEHICLE COMMUNICATION NETWORK

(71) Applicant: GM GLOBAL TECHNOLOGY OPERATIONS LLC, Detroit, MI (US)

(72) Inventors: Timothy J. Talty, Beverly Hills, MI (US); Jiun-Ren Lin, Newark, CA (US); Ozan Tonguz, Pittsburgh, PA (US); Dan Shan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 216 days.

(21) Appl. No.: 15/165,632

(22) Filed: May 26, 2016

(65) Prior Publication Data

US 2016/0352533 A1 Dec. 1, 2016

Related U.S. Application Data

(60) Provisional application No. 62/230,163, filed on May 29, 2015.

(51) Int. Cl.

| | |
|---|---|
| *H04W 4/12* | (2009.01) |
| *H04L 12/26* | (2006.01) |
| *H04L 12/40* | (2006.01) |
| *H04L 29/06* | (2006.01) |
| *H04L 29/08* | (2006.01) |
| *H04W 4/04* | (2009.01) |

(52) U.S. Cl.
CPC ......... *H04L 12/4015* (2013.01); *H04W 4/12* (2013.01); *H04L 43/0805* (2013.01); *H04L 67/12* (2013.01); *H04L 69/28* (2013.01); *H04L 2012/40215* (2013.01); *H04L 2012/40273* (2013.01); *H04W 4/046* (2013.01)

(58) Field of Classification Search
None
See application file for complete search history.

(56) References Cited

U.S. PATENT DOCUMENTS

| | | | | |
|---|---|---|---|---|
| 5,636,223 A | * | 6/1997 | Reardon | H04W 74/02 370/431 |
| 7,586,933 B2 | * | 9/2009 | Belschner | H03M 13/43 370/254 |

(Continued)

*Primary Examiner* — Noel R Beharry
*Assistant Examiner* — Rodrick Mak
(74) *Attorney, Agent, or Firm* — Cantor Colburn LLP (57) ABSTRACT

Technical solutions are described for facilitating intra-vehicle wireless communication among a plurality of electronic control units. An example method includes determining, by a first electronic control unit in a vehicle, a wait-time for a message, which is to be transmitted to a second electronic control unit in the vehicle via a wireless channel. The first electronic control unit executes a first availability-check, by determining availability of the wireless channel. In response to the first availability-check indicating that the wireless communication channel is available, the method includes delaying transmission of the message by the wait-time. The method also includes executing, by the first electronic control unit, after passage of the wait-time, a second availability-check. In response to the second availability-check indicating that the wireless communication channel is still available, the method includes transmitting the message for receipt by the second electronic control unit.

15 Claims, 6 Drawing Sheets

(56) References Cited

U.S. PATENT DOCUMENTS

| | | | | |
|---|---|---|---|---|
| 9,756,549 B2* | 9/2017 | Perdomo | ............... | H04W 40/12 |
| 2004/0081079 A1* | 4/2004 | Forest | ................... | H03M 13/43 |
| | | | | 370/216 |
| 2008/0107029 A1* | 5/2008 | Hall | ................. | H04L 12/40163 |
| | | | | 370/235 |
| 2009/0044244 A1* | 2/2009 | Chang | ................. | H04N 5/4401 |
| | | | | 725/131 |
| 2009/0086763 A1* | 4/2009 | Kopetz | .............. | H04L 12/4015 |
| | | | | 370/498 |
| 2009/0116411 A1* | 5/2009 | Castagnoli | ............ | H04W 48/16 |
| | | | | 370/256 |
| 2012/0295547 A1* | 11/2012 | Ichikawa | ............ | B60L 11/1824 |
| | | | | 455/66.1 |
| 2012/0320759 A1* | 12/2012 | Shao | .................... | H04W 24/02 |
| | | | | 370/242 |
| 2014/0334293 A1* | 11/2014 | Narasimha | ............ | H04W 28/08 |
| | | | | 370/229 |
| 2015/0212958 A1* | 7/2015 | Hara | ................... | H04L 12/4625 |
| | | | | 710/116 |
| 2015/0264627 A1* | 9/2015 | Perdomo | ............... | H04W 40/12 |
| | | | | 370/329 |
| 2016/0249357 A1* | 8/2016 | Green | ................... | H04W 24/08 |
| 2016/0294697 A1* | 10/2016 | Varadarajan | ............ | H04L 47/12 |
| 2017/0181190 A1* | 6/2017 | Aryafar | ............. | H04W 74/0816 |

* cited by examiner

HYBRID INTRA-VEHICLE COMMUNICATION NETWORK

CROSS REFERENCE TO RELATED APPLICATIONS

This application claims priority to U.S. provisional patent application Ser. No. 62/230,163, filed May 29, 2015, and all the benefits accruing therefrom under 35 U.S.C. § 119, and the contents of 62/230,163 in its entirety are herein incorporated by reference.

TECHNICAL FIELD

The present disclosure relates to electronic control units and particularly to communications among multiple electronic control units within a vehicle.

BACKGROUND

Electronic Control Units (ECUs), which are electronic devices, control most of the vehicular operations of a vehicle, such as a car, a truck, a boat, and other such automobiles. A vehicle can have multiple ECUs for various subsystems. For example, a vehicle may include an Engine Control Module (ECM), which is an ECU that may control other ECUs such as ECUs used for transmission, Anti-lock Braking System (ABS), airbags, windows, doors and mirrors, charging systems, Heating, Ventilation, and Air Conditioning (HVAC), etc. According to the designated functions, each ECU collects sensor data directly from sensors and/or communicates with other ECUs in order to coordinate or exchange information. To meet the requirements of inter-ECU communications and to reduce the number of interconnections, vehicle buses are added to a vehicle as the medium for inter-ECU communications.

A vehicle bus is a specialized communications network that interconnects the ECUs inside a vehicle. The ECUs may communicate in a wired manner on the vehicle bus using a communication protocol such as Controller Area Network (CAN), FlexRay, and Ethernet, among others.

Although protocols such as the CAN Bus have been used over the last decade for automotive applications, they are not perfectly robust. Common failures that can sabotage the communications are possible. A well-known issue is called the "babbling idiot" problem, and it occurs when a node suffers functional or component fault and begins to transmit messages onto the bus in an incorrect or unpredictable manner. As a result, an ECU that suffers the babbling idiot issue may consume an abnormal amount of bandwidth and starve other ECUs on the bus.

In addition to an increased demand for reliability, car manufacturers are also facing an increasing demand for network bandwidth for communications among the intra-vehicle ECUs. Such an increased demand for bandwidth is a result of additional features of the vehicle, for example back-up cameras, parking sensors, cruise control, among others. For example, real-time image and video generated by multiple cameras are used for safety features in the vehicle. Furthermore, the infotainment systems on the vehicle are sophisticated and multi-functional, resulting in high data volumes to be processed and transported among ECUs. The data bandwidth of a CAN Bus (500 kbps to 1 Mbps) is, thus, insufficient for such increased demand for intra-vehicle communication. Car manufacturers, in response, have increased the number of CAN buses in the vehicle or introduced high-bandwidth communication protocols like Ethernet. However, the number of CAN interfaces on ECUs limits the number of CAN buses that can be added, while Ethernet, which has the highest bandwidth among all candidates for inter-ECU communications, can only accommodate compressed camera data, which suffers from both high latency and error propagation in time and/or space domain.

SUMMARY

According to one or more exemplary embodiments, a computer-implemented method for facilitating intra-vehicle wireless communication among a plurality of electronic control units includes determining, by a first electronic control unit in a vehicle, a wait-time for a message, which is to be transmitted to a second electronic control unit in the vehicle via a wireless communication channel. The computer-implemented method also includes executing, by the first electronic control unit, a first availability-check, which includes determining availability of the wireless communication channel. In response to the first availability-check indicating that the wireless communication channel is available, the method includes delaying transmission of the message by the wait-time. The computer-implemented method also includes executing, by the first electronic control unit, after passage of the wait-time, a second availability-check to determine the availability of the wireless communication channel. In response to the second availability-check indicating that the wireless communication channel is still available, the method includes transmitting the message for receipt by the second electronic control unit.

According to one or more embodiments, an electronic control unit of a vehicle includes a memory, a wireless communication interface, and a processor coupled with the memory and the wireless communication interface. The processor determines a wait-time for a message, which is to be transmitted to a second electronic control unit in the vehicle via a wireless communication channel using the wireless communication interface. The processor executes a first availability-check, which includes determining availability of the wireless communication channel. In response to the first availability-check indicating that the wireless communication channel is available, the processor delays transmission of the message by the wait-time. After passage of the wait-time, the processor executes a second availability-check to determine the availability of the wireless communication channel. In response to the second availability-check indicating that the wireless communication channel still being available, the processor transmits the message for receipt by the second electronic control unit.

According to one or more embodiments, a computer program product for facilitating intra-vehicle wireless communication among a plurality of electronic control units includes a non-transitory computer-readable memory. The computer-readable memory includes instructions to determine a wait-time for a message, which is to be transmitted to a second electronic control unit in the vehicle via a wireless communication channel. The computer-readable memory also includes instructions to execute a first availability-check, which includes determining availability of the wireless communication channel. The computer-readable memory also includes instructions to, in response to the first availability-check indicating that the wireless communication channel is available, delay transmission of the message by the wait-time. The computer-readable memory also includes instructions to, after passage of the wait-time, execute a second availability-check to determine the availability of the wireless communication channel. The computer-readable memory also includes instructions to, in response to the second availability-check indicating that the wireless communication channel still being available, transmit the message for receipt by the second electronic control unit.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION

The following description is merely exemplary in nature and is not intended to limit the present disclosure, its application, or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The technical solutions described herein facilitate a hybrid intra-vehicle communication network among multiple ECUs of the vehicle. The hybrid intra-vehicle communication network implementing the technical solutions described herein addresses the aforementioned reliability issues as well as the lack of bandwidth, among other technical problems as will be evident to the reader. The technical solutions described herein add wireless communications to the inter-ECU communication networks, creating a hybrid inter-ECU communications architecture that combines wired and wireless networks.

The hybrid communication network increases the reliability of the vehicle bus through transmission medium diversity, over wired and wireless communications. Further, the hybrid communication network facilitates an increased throughput, for example, by off-loading a part the communications from the wired vehicle bus to the wireless communications. For example, the communication messages, which may include non-safety-critical data, may be communicated via inter-ECU wireless links instead of the wired vehicle bus.

Figure 1:
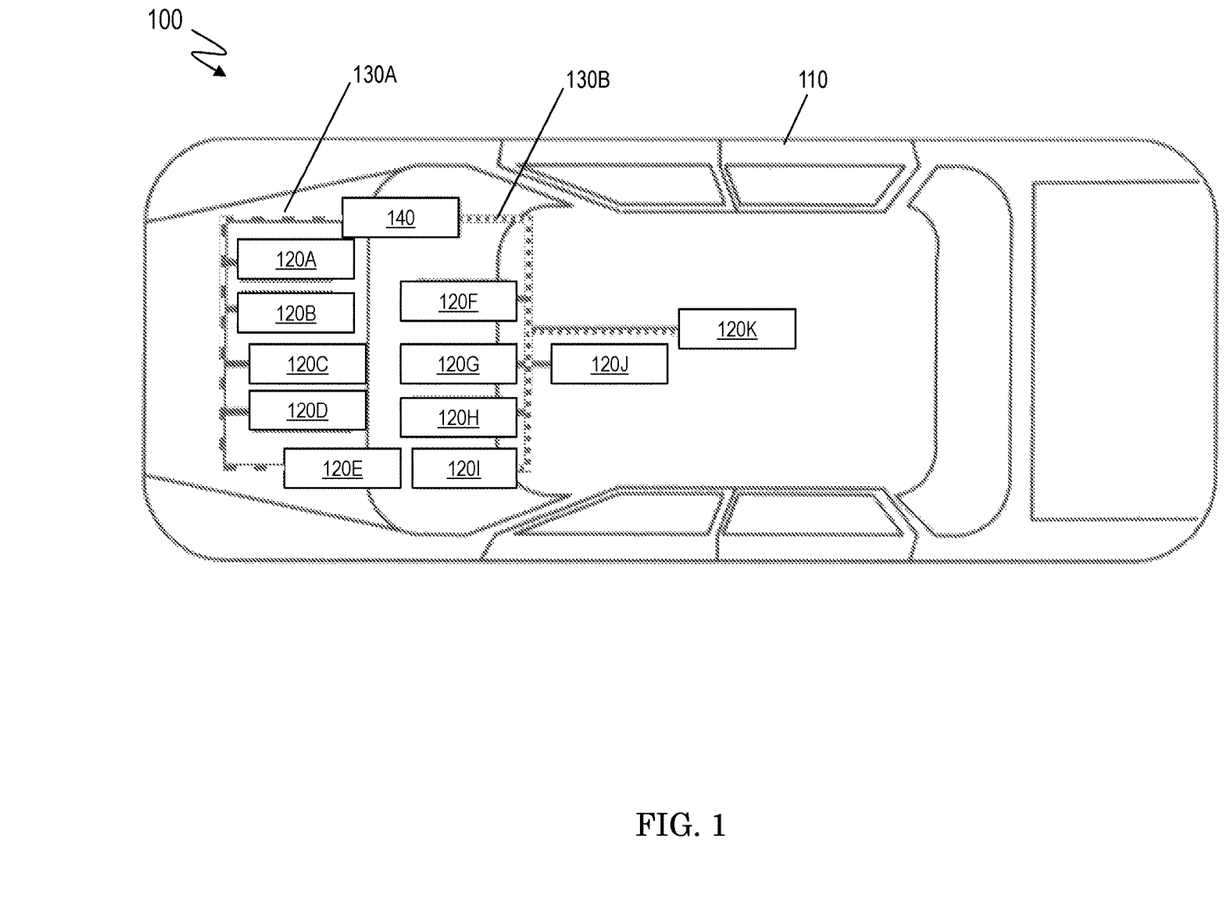
FIG. 1 illustrates an example of an intra-vehicle inter-ECU communication network.

FIG. 1 illustrates an example hybrid intra-vehicle communication network 100, which is part of a vehicle 110. The network 100 includes multiple ECUs 120A-120K coupled with each other for communication using two vehicle buses, a vehicle bus 130A, and a vehicle bus 130B. The wired communication among the ECUs 120A-120K is managed by a gateway 140.

The vehicle 110 may be any vehicle such as a car, a truck, a boat, or any other automobile that includes ECUs. The two vehicle buses 130A and 130B may facilitate wired communication among the ECUs using a communication protocol such as CAN, FlexRay, Ethernet, and the like. The two vehicle buses 130A and 130B may both use the same or different communication protocols. The gateway 140 facilitates the wired communication between the ECUs that are connected on the separate vehicle buses 130A and 130B.

The ECUs 120A-120K may facilitate controlling one or more respective component(s) of the vehicle 110. For example, the ECU 120A may be responsible for brake control. The ECU 120B may be responsible for engine control. The ECU 120C may be responsible for transmission control. The ECU 120D may be responsible for steering wheel control. The ECU 120E may be responsible for suspension control. The ECU 120F may be responsible for audio control. The ECU 120G may be responsible for infotainment control. The ECU 120H may be responsible for central electronic circuitry control. The ECU 120I may be responsible for driver information control. The ECU 120J may be responsible for climate control. The ECU 120K may be responsible for phone interactivity control. It is understood that in other examples, the vehicle may have more or fewer ECUs responsible for different functions than those illustrated in FIG. 1 and described herein.

Figure 2:
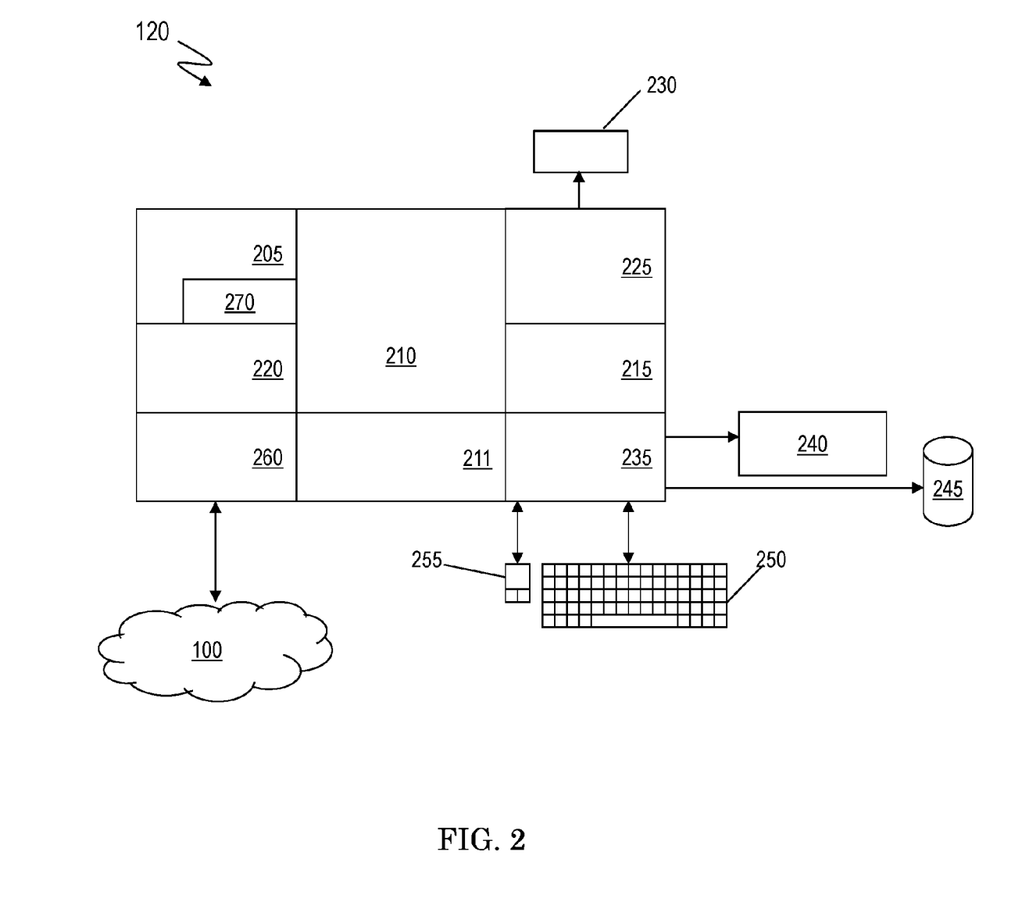
FIG. 2 illustrates example components of an electronic control unit of a vehicle.

FIG. 2 illustrates example components of an ECU 120. The ECUs 120A-120K may include the components similar to the ECU 120. The ECU 120 includes, among other components, a processor 205, memory 210 coupled to a memory controller 215, and one or more input devices 245 and/or output devices 240, such as peripheral or control devices that are communicatively coupled via a local I/O controller 235. These devices 240 and 245 may include, for example, vehicle sensors, battery sensors, position sensors, altimeter, accelerometer, inertia sensor, force sensor, tire-pressure sensor, gyro meter, indicator/identification lights and the like. Input devices may include button panels 250 and/or touch screen 255 among others, which may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance storage, a network interface card (NIC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the ECU 120, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on.). The processor 205 may include interfacing circuits for communication devices or peripherals such as CAN, GPS and WiFi etc., and may include hardware accelerators for signal processing purposes, such as H.264 codec and GPU etc. In one or more examples, the I/O controller 235 may perform some or all of the functions of the processor 205. Note that there may be more than one processor 205 existing in the ECU 120 to enhance the capability of the ECU to process instructions in parallel. In such case, there may be additional memory units 210 and cache 270 for each processor 205, and communication paths among the processors for information exchange.

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remotely from one another but may be accessed by the processor 205.

The instructions in memory 210 may include one or more separate programs, each of which comprises an ordered listing of executable instructions for implementing logical functions. In the example of FIG. 2, the instructions in the memory 210 include one or more suitable operating systems (OS) 211 hosted by a supervisor (not illustrated) in case of multiple OS's. The operating system 211 may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive, solid state drive, flash memory, among other types of storage. The stored instructions in memory 210 or in storage 220 may include those enabling the processor to execute one or more aspects of the systems and methods of this disclosure.

The ECU 120 may further include a display controller 225 coupled to a user interface or display 230. In some embodiments, the display 230 may be an LCD screen. In other embodiments, the display 230 may include a plurality of LED status lights.

The ECU 120 may further include a network interface 260 for coupling to the hybrid communication network 100. The network interface 260 transmits and receives data between the ECU 120 and other ECUs in the vehicle 110 using the vehicle buses 130A and 130B. The network interface 260 further facilitates communication with the other ECUs in the vehicle 110 in a wireless fashion, for example, using wireless protocols and technologies, such as WI-FI™, WIMAX™, satellite, RF, BLUETOOTH™, ZIGBEE™, or any other. The wireless communication network may be a packet-switched network similar to a local area network, wide area network, metropolitan area network, the Internet, or other network environment.

Figure 3:
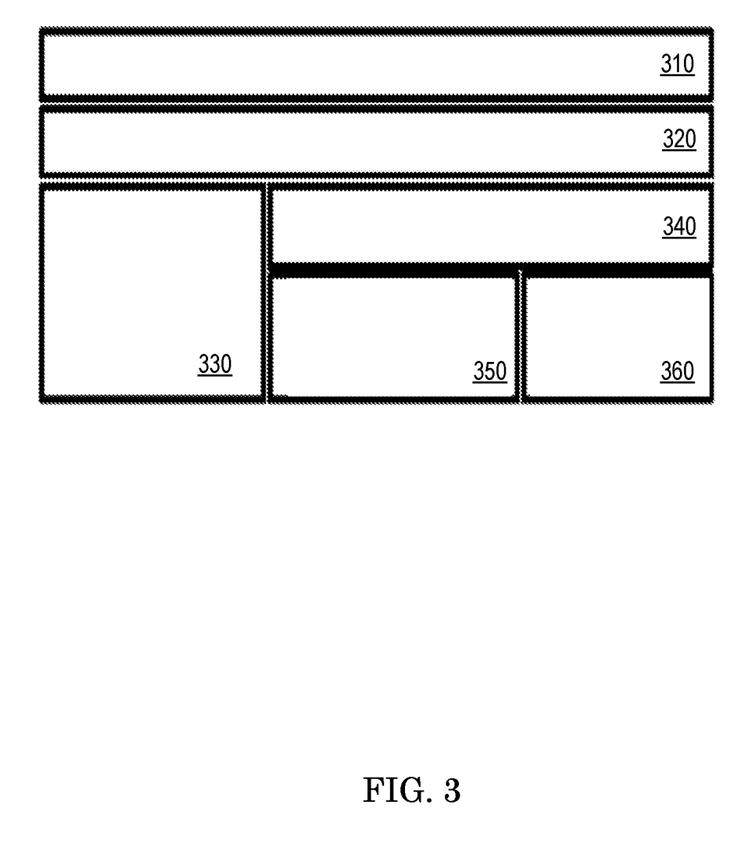
FIG. 3 illustrates another view of an electronic control unit of a vehicle.

FIG. 3 illustrates another view of the ECU 120 to illustrate the ECU's communication with the other ECUs in the vehicle 110 using the network 100, which uses a hybrid network architecture. In one or more examples, the hybrid network architecture illustrated in FIG. 3 may be implemented using computer executable instructions. FIG. 3 illustrates an ECU application 310 executing on the ECU 120. The ECU 120 further includes a vehicle communications unit 320 that manages communication of the ECU 120. The vehicle communication unit 320 may control the communications of the ECU 120 with the peripheral devices 240, such as sensors via a sensor-ECU communication interface 330. The vehicle communication unit 320 may control the communications of the ECU 120 with other ECUs in the vehicle 110 using an inter-ECU communication interface 340. As described herein, the inter-ECU communication may be performed using the network 100, one or more wired communication channels 360 and one or more wireless communication channels 350. It is understood that in other examples, the ECU 120 may include fewer or additional components that implement the operations of the components illustrated in FIG. 3, and that the components illustrated in FIG. 3 are just one organization of the operations.

In the illustrated example of FIG. 3, the vehicle communication unit 320 interfaces the operations of the communication with the peripheral device 240 and the other ECUs of the vehicle 110 from the ECU application 310. The vehicle communication unit 320 may include computer executable instructions that control operation of hardware, such as the processor 205, to implement one or more methods for the interfacing. Accordingly, the vehicle communications unit 320 provides a single communications interface to the ECU application 310 so that the higher layer does not have to be modified to support different networks or protocols. For example, the ECU application 310 sends a message, such as in the form of a communication packet, by calling an application-programming interface (API) provided by the vehicle communications unit 320. Calling the API instructs the vehicle communication unit 320 to forward the packet. The vehicle communication unit 320 may identify information about the packet from a header of the packet. For example, the header may include information such as a destination ECU, a destination application on an ECU, a destination sensor, among other information. The vehicle communication unit 320, based on the information in the header, directs either the sensors-ECU communication interface 330 and/or the inter-ECU communication interface 340 to forward the data in the packet for receipt by the destination of the packet. The sensors-ECU communication interface 330 and the inter-ECU communication interface 340 further interfaces the vehicle communication unit 320 from the protocols used for communicating with the respective recipients, that is, the sensors and the other ECUs.

The sensors-ECU communications interface 330 handles the communications between the ECU 120 and multiple sensors that directly connect to the ECU 120. For example, when the ECU application 310 retrieves sensor information and measurements and sends commands or requests to the sensors, the communication packets pass through the sensors-ECU interface 330, and the vehicle communications unit 320. The sensors-ECU interface 330 facilitates conversion of data to and from the sensors in communication protocols used by the sensors, such as Local Interconnect Network (LIN), which is typically used for serial communication by sensors. Alternatively or in addition, the sensors-ECU interface 330 may facilitate conversion of data to and from other wired or wireless sensor communication protocols such as ZIGBEE™, BLUETOOTH LOW ENERGY™ (BLE™) and the like.

The inter-ECU communications interface 340 handles conversion of the data according to the communication protocol(s) among the ECUs in the vehicle 110. The inter-ECU communications interface 340 uses the wired communication channel 360 (for example, a CAN interface) for abstracting the communication with other ECUs using the vehicle buses 130A and 130B. The inter-ECU communication interface 340 uses the wireless communication channel 350 for abstracting the communication with the other ECUs in a wireless manner. Accordingly, the inter-ECU communication interface 340 encapsulates the hybrid inter-ECU communication networks and provides a single interface for the higher layers to perform communications with other ECUs, namely the vehicle communication unit 320 and the ECU application 310 in FIG. 3. The inter-ECU communications interface 340 determines which medium to send an inter-ECU packet, for example based on link condition, throughput arrangement, and priority management. This may be referred to as dynamic medium switching (DMS) by the inter-ECU communications interface 340. The inter-ECU communication interface 340 also collects packets received from both the wired and wireless links, for example from the other ECUs, and passes the received packets to the upper layers.

For example, when the inter-ECU communication interface 340 detects that the packet error rate on the wired communication channel 360 is higher than a predefined threshold, the inter-ECU communication interface 340 switches communication to the wireless communication link 350 for error recovery. The communication packets, which may have higher priority values, such as packets containing safety-critical data, may be transferred on both the wired communication channel 360 and the wireless communication channel 350 for reliability. Furthermore, the inter-ECU communication interface 340 may send packets with lower priority, such as packets containing infotainment data, via the wireless communication channel 350 to reduce the load and delay on the vehicle buses 130A and 130B.

In one or more examples, the wireless inter-ECU communication may have a static mesh topology, while the ECU 120 and its corresponding sensors may form a star-topology. That is, ECU 120 may communicate with any of the other ECUs 120A-120K in the vehicle 110, with the locations of the ECUs being fixed. The wireless communication channel 350 provides at least 1 Mbps throughput. The inter-ECU communication unit 340 further uses a priority management scheme to communicate via the wireless channel 350. The ECU 120 uses the priority management scheme based on media access control (MAC) which facilitates a lowest latency for communication packets with the highest priority, while still maintaining a collision free transfer of the packets.

Figure 4:
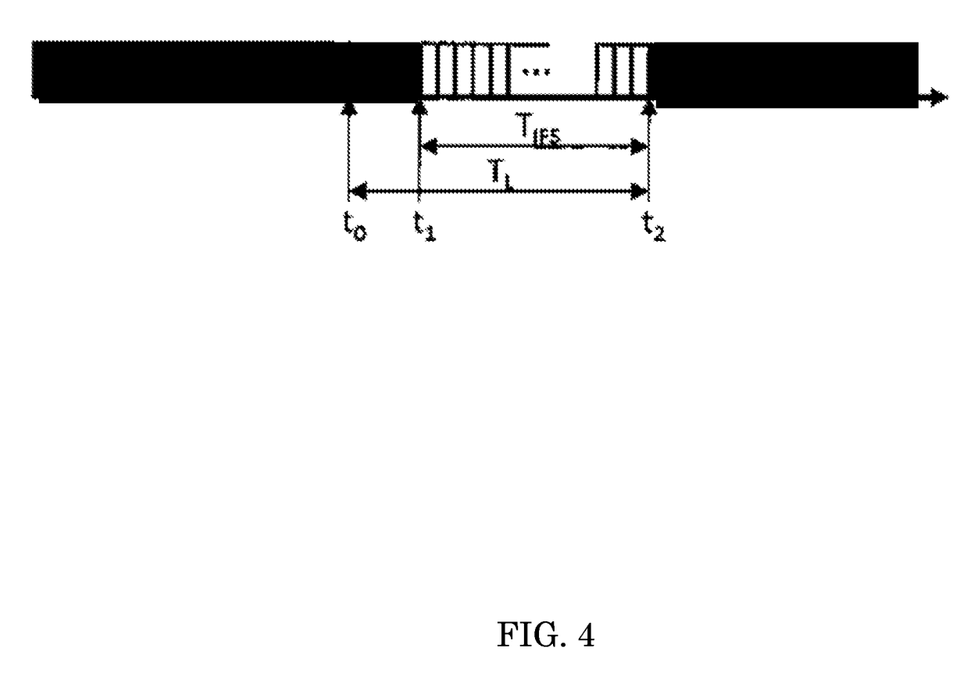
FIG. 4 illustrates a MAC timing diagram for intra-vehicle wireless inter-ECU communication.

For example, when the network is initiated, (i.e. when the vehicle 110 starts) a short packet that is called a beacon is transmitted by a predefined ECU from among the ECUs 120A-120K in the vehicle 110. The beacon serves as a common timing reference point for all of the ECUs 120A-120K. Each ECU 120 continuously monitors the wireless communication channel 350 and the inter-ECU communication unit 340 to receive one or more inter-ECU packets that are to be sent to or from the ECU 120 respectively. When the ECU 120 has an inter-ECU packet pending to send, the ECU 120 waits for a predefined Inter-Frame Space (IFS) duration starting from the end of the current transmission (i.e., either a beacon or a normal inter-ECU packet) and then tries to transmit the packet. Now, if the wireless communication channel 350 is free, the ECU 120 transmits the packet. On the other hand, if the wireless communication channel is busy, the ECU 120 keeps receiving the inter-ECU packets, and continues to monitor the wireless communication channel 350 without sending the packet at that time. Once the wireless communication channel 350 becomes free, the ECU 120 starts to wait for the IFS duration and tries to transmit the packet again after the IFS duration has passed. FIG. 4 illustrates a MAC timing diagram for the technical solutions described herein for the intra-vehicle wireless inter-ECU communication. For example, in FIG. 4, at time $t_0$, the ECU 120 has a packet to transmit via the wireless communication channel 350, which is busy and the ECU 120 is receiving. When the wireless communication channel 350 becomes free at time $t_1$, the ECU 120 starts the waiting timer. At time $t_2$, which is after the duration of the predefined wait-time of IFS, if the wireless communication channel is still free, the ECU 120 starts to transmit the packet. The ECU 120 maintains a priority queue to store the packets pending transmission. The technical solutions described herein facilitate the ECU 120 to determine the IFS wait-time dynamically based on the packet's priority value. For example, if there is a packet with the highest priority in the queue, the ECU 120 tries to send that packet first. In an example, the priority value, and accordingly, the duration of the wait-time are decided according to the ECU and the application to which the packet is being sent. It is understood that one ECU may execute more than one ECU applications with different priorities, as described herein.

In the vehicle 110, assume that each ECU 120 is assigned a unique sequence number that is an integer ranging from 1 to $N_e$, where $N_e$ represents the total number of the ECUs 120A-120K inside the vehicle 110. The sequence numbers of ECUs 120A-120K may be pre-ordered, for example based on the role of the respective ECUs 120A-120K in safety of an occupant of the vehicle 110. For instance, the sequence number of the engine ECU 120B may be smaller than the audio ECU 120F. Further, the priority value of a packet may be denoted by another integer ranging from 0 to $N_p-1$. Consider that the lower the priority value, the higher the priority, that is, priority 0 is the highest priority among the total $N_p$ priority values, $N_p-1$ is the lowest priority value. Vector s is used to denote the sequence numbers of all the ECUs and vector p represents all of the priority values. The variables Ne and Np are predefined specifically for the vehicle 110; for example at the time the vehicle 110 was designed or manufactured. Furthermore, to determine the IFS for a specific packet, an integer variable k is defined. The k value of a specific packet is determined by a $N_e \times N_p$ matrix T.

Each element $T_{ij}$ in the matrix T represents the k value of a packet with priority j-1 and being transmitted by the ECUi. Moreover, k=1 is reserved for the ACK (acknowledgement) packets, and k=K is reserved for the beacon packet. Therefore, k is an integer ranging from 1 to K. The IFS of the specific packet is assigned by.

$I_{ij}=T_{ij} \times S=k \times S$, where S is the duration of one time-slot.

The technical solutions thus facilitate that the k value of a packet with a higher priority is always smaller than the k value of another packet with a lower priority. In turn, the IFS of the high-priority packet is smaller and facilitating that packet to access the wireless communication channel 350 before the other packet with the lower priority. Also, if two packets from different ECUs have the same priority assignment, the packet from the ECU with smaller sequence number accesses the wireless communication channel 350 earlier. Thus, the MAC design is collision-free since the IFS for each type of packet from each ECU is unique.

The beacon packet facilitates the collision-free nature of the MAC design. For example, when there are back-to-back packet transmissions, each ECU 120 keeps receiving the packets and uses the end of each packet transmission as the common starting point to wait for the IFS duration. Because the IFS duration for each type of packet from each ECU is different, potential collision is avoided. However, if all of the ECUs have no packets to send, the synchronization could be lost, and there could be no common timing reference point for later packet transmissions. To solve this problem, the technical solutions use the longest IFS, i.e., with k=K, for the beacon packet, and the beacon packet is always being sent when none of the ECUs 120A-120K tries to contend for the wireless communication channel 350. In other words, the beacon always contends the wireless communication channel 350 with the least priority. If none of the ECUs 120A-120K have packets to send, the beacon is sent, and the end of the beacon packet is used as the common timing reference point for a next packet transmission.

Accordingly, the network 100 implementing the technical solutions described herein avoids collisions when two ECUs try to send packets at the same time. The technical solutions further facilitate that packets with a higher priority are sent prior to packets with lower priority, leading to shorter delays for the higher priority packets. Accordingly, the latency of the packets with a higher priority is smaller than the latency of the packets with a lower priority.

The value of S in the above equation for determining the k value for a packet affects the performance of the technical solutions described herein. The minimum time slot S has to accommodate the longest propagation delay of the wireless communication channel 350 inside the vehicle 110 and the turnaround time of the transceiver to switch from receiving to transmitting modes. For example, typically, the length of the vehicle 110 may be less than 6 meters, so the length of a time slot has to be longer than about 20 nanoseconds. However, the turnaround time of a wireless transceiver can range from several to a few hundred microseconds, which incurs a large overhead. To solve this technical problem, the ECU uses a transceiver with a turnaround time of a few microseconds, such as 5 microseconds, 10 microseconds, or any other value compatible with a wireless network communication standard being used, such as WIFI™.

Alternatively, the equation for the IFS includes a time delay, such as $I_{ij}=T_{delay}+T_{ij}\times S=T_{delay}+k\times S$, where S is the duration of one time-slot and $T_{delay}$ is a delay value associated with the RF propagation delay. For example, because the value of S has to be larger than the turnaround time of the RF transceiver, if the propagation delay inside the vehicle 110 is below a predetermined threshold, such as (5 m/3*10^8)~=17 nanoseconds, the S value of 1-2 microseconds is much larger than the propagation delay. The propagation delay may depend on the length of the vehicle 110. However, for cases where the propagation delay is above the predetermined threshold, to ensure that the S value is larger than the turnaround time of the RF transceiver, a constant $T_{delay}$ value is added, where the $T_{delay}$ value equals the propagation delay value.

Alternatively or in addition, the ECU 120 uses a wireless receiver that is dedicated to clear channel assessment in order to minimize the time slot S. However, in any case, the time slot S has to be larger than the RF propagation delay in the vehicle so that the timeslot duration is longer than the RF turnaround time, otherwise, the ECU 120 may not start to send data before the end of its timeslot.

Figure 5:
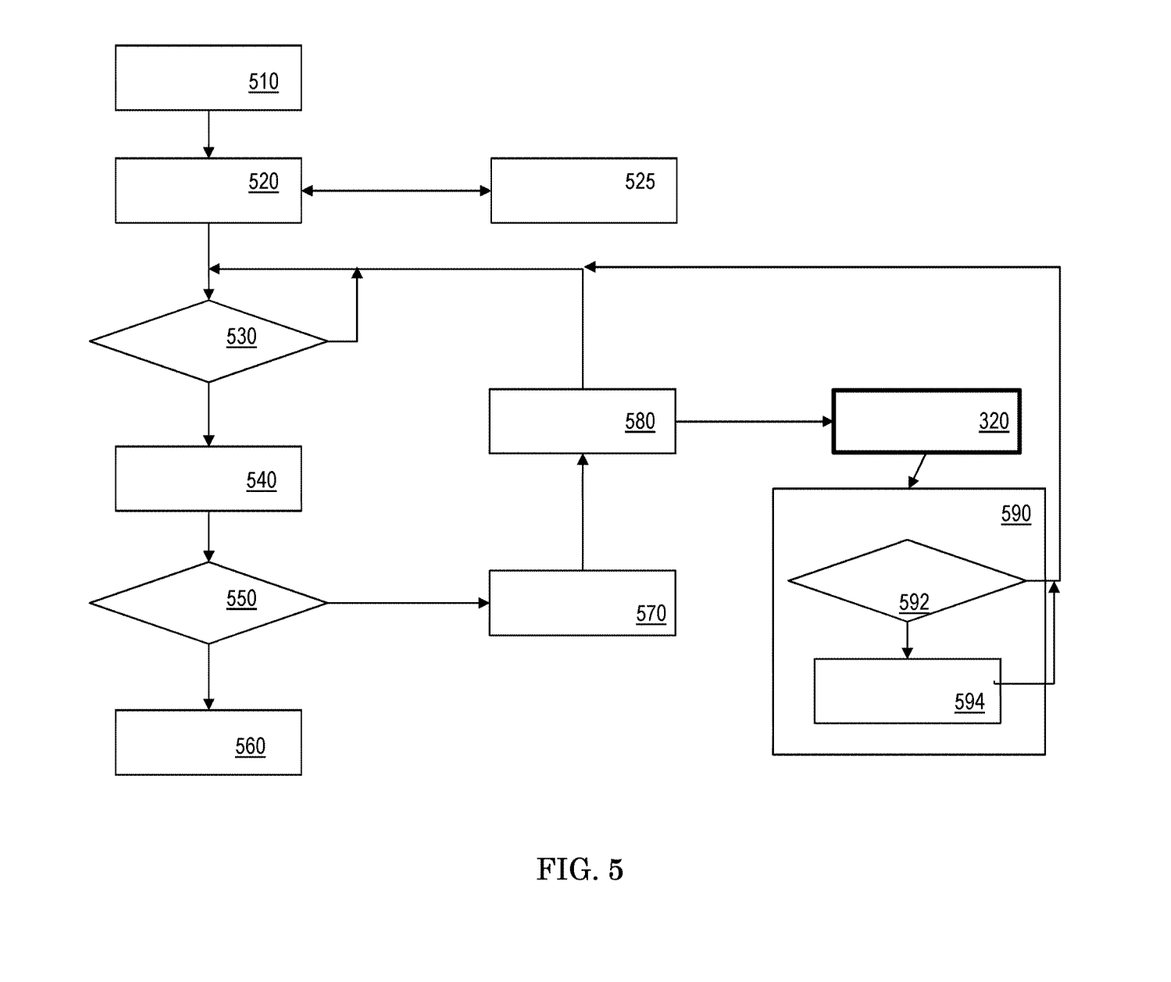
FIG. 5 illustrates a flowchart of an example method for intra-vehicle ECU communication in a wireless manner.

FIG. 5 illustrates a flowchart of an example method for intra-vehicle ECU communication in a wireless manner. For example, the ECU 120 has a message $M_i$ that is to be sent to another ECU in the vehicle 110 using the wireless communication channel 350, as shown at block 510. The ECU 120 maintains a loop-counter for the message $M_i$, which the ECU 120 initializes to a default value, such as 0 (zero), as shown at block 510. The ECU 120 determines a priority value of the message $M_i$, as shown at block 520. The ECU 120 computes the priority value for $M_i$ by computing the k value as described herein, and assigns the priority value to $M_i$, as shown at block 525. In one or more examples, the smaller the priority value k is (i.e., k represents higher priority), the greater are the chances that $M_i$ is related to the safety of one or more occupants of the vehicle 110.

The ECU 120 executes a first availability-check for the wireless communication channel 350, as shown at block 530. An availability-check determines whether the wireless communication channel 350 is available (or free) to transmit the message $M_i$. If the wireless communication channel 350 is busy, the ECU 120 continues to execute the first availability-check until the wireless communication channel 350 is not busy, that is, is available for transmitting $M_i$. To access the wireless media, the ECU 120 delays the transmission of $M_i$ by the wait-time IFS, as shown at block 540. The delay facilitates accessing the wireless communication channel 350 in a contention manner, rather than determining whether the channel 350 is available or not. As described herein, the wait-time is based on the priority value of $M_i$. After the wait-time has elapsed, the ECU 120 executes a second availability-check for the wireless communication channel 350, as shown at block 550. In one or more examples, the ECU 120 performs a continuous channel availability check during the "wait-time" instead of just waiting (not shown in FIG. 5). The continuous availability check facilitates the ECU 120 to access the wireless communication channel 350 in case another ECU sends a packet shorter than the IFS. If the second availability-check indicates that the wireless communication channel 350 is available (not busy), the ECU 120 proceeds to transmit $M_i$ to the destination ECU via the wireless communication channel 350, as shown at block 560.

If the second availability-check indicates that the wireless communication channel 350 is busy, the ECU 120 increments the loop-counter corresponding to $M_i$, as shown at block 570. The wireless communication channel 350 being busy at the second-availability check may indicate that some other ECU started using the wireless communication channel 350 while the ECU 120 was waiting for the wait-time to elapse. The ECU 120 further reports the value of the loop-counter and the priority value of $M_i$ to the vehicle communication unit 320, which is at a higher layer in the network architecture, as shown at block 580. The ECU 120 proceeds to the first availability-check and continues the loop until the message $M_i$ is transmitted, as shown at block 580.

The vehicle communication unit 320 revises the priority value of n if the loop-counter crosses a predetermined threshold, as shown at blocks 590, 592, and 594. The predetermined threshold is specific to the priority value of the message $M_i$. Thus, a first priority value may have a first predetermined threshold value and a second priority value may have a second predetermined threshold for the loop-counter. The revised priority value facilitates the ECU 120 to shorten the wait-time IFS of $M_i$, in turn increasing the chances of $M_i$ being transmitted via the wireless communication channel 350. Note that each ECU 120 can only revise or change the IFS value of Mi to another IFS value that is assigned to this specific ECU to ensure no more than two ECUs would use the same IFS to contend the wireless channel.

By implementing the method as described, the ECU 120 facilitates transmitting $M_i$ via the wireless communication channel 350 in a collision-free manner, and with lower latency than using other protocols, for example using Carrier Sense Multiple Access (CSMA) protocol.

Figure 6:
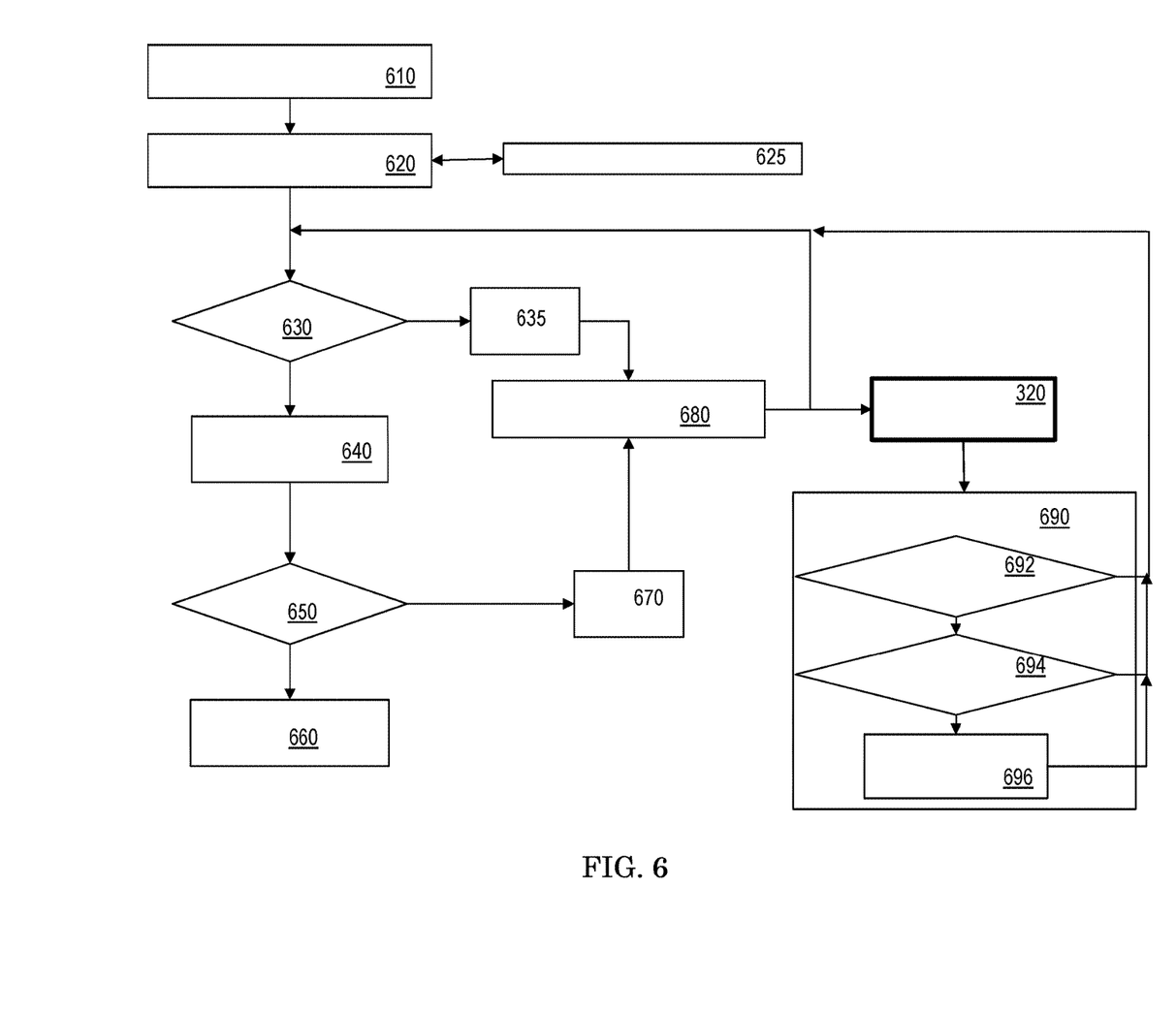
FIG. 6 illustrates a flowchart of another example method for intra-vehicle ECU communication in a wireless manner.

FIG. 6 illustrates a flowchart of another example method for intra-vehicle ECU communication in a wireless manner. The ECU 120 has a message $M_i$ that is to be sent to another ECU in the vehicle 110 using the wireless communication channel 350, as shown at block 610. In this example method, the ECU 120 uses and maintains two loop-counters, a first loop-counter and a second-loop counter for the message $M_i$, which it initializes to default values, such as 0 (zero), as shown at block 610. The ECU 120 determines a priority value of the message $M_i$ by computing the k value as described herein, and as shown at blocks 620 and 625.

The ECU 120 executes a first availability-check for the wireless communication channel 350, as shown at block 630. If the first availability-check indicates that the wireless communication channel 350 is busy, the ECU 120 increments the first loop-counter, as shown at block 635. The ECU 120 further reports the values of the two loop-counters to the vehicle communication unit 320, which is at a higher layer in the network architecture, as shown at block 680. The ECU 120 continues to execute the first availability-check until the wireless communication channel 350 is not busy, that is, is available for transmitting $M_i$.

In response to detecting that the wireless communication channel 350 is available, the ECU 120 delays the transmission of $M_i$ by the wait-time IFS, as shown at block 640. As described herein, the wait-time is based on the priority value of $M_i$. After the wait-time has elapsed, the ECU 120 executes a second availability-check for the wireless communication channel 350, as shown at block 650. If the second availability-check indicates that the wireless communication channel 350 is available (not busy), the ECU 120 proceeds to transmit $M_i$ to the destination ECU via the wireless communication channel 350, as shown at block 660.

If the second availability-check indicates that the wireless communication channel 350 is busy the ECU 120 increments the second loop-counter corresponding to $M_i$, as shown at block 670. The wireless communication channel 350 being busy at the second-availability check may indicate that some other ECU started using the wireless communication channel 350 while the ECU 120 was waiting for the wait-time to elapse. The ECU 120 further reports the values of the two loop-counters to the vehicle communication unit 320, which is at a higher layer in the network architecture, as shown at block 680. The ECU 120 returns to execute the first availability-check until the wireless communication channel 350 is not busy, that is, is available for transmitting $M_i$.

The vehicle communication unit 320, in response to receiving the value of the two loop-counters and the priority value of the message $M_i$, determines if the priority value is to be revised, as shown at block 690. The vehicle communication unit 320 compares the first loop-counter with a first predetermined threshold and the second loop-counter with a second predetermined threshold, as shown at blocks 692 and 694. If the two loop-counters cross their respective threshold values, the vehicle communication unit 320 increases the priority value of $M_i$, as shown at block 696. The predetermined threshold values may be specific to the priority value of the message $M_i$. Thus, a first priority value may have different values for the first and second predetermined thresholds than a second priority value. The ECU 120 continues to execute the first availability-check with the priority value of $M_i$, which may or may not be revised by the vehicle communication unit 320. In one or more examples, the vehicle communication unit 320 increases the priority value of $M_i$ in response to either of the loop-counters crossing their respective thresholds (as shown in FIG. 6). Alternatively or in addition, vehicle communication unit 320 increases the priority value of $M_i$ in response to both loop-counters crossing their respective thresholds (not shown in FIG. 6).

By implementing the method as described, the ECU 120 facilitates transmitting $M_i$ via the wireless communication channel 350 in a collision-free manner, and with lower latency than transmitting messages using other protocols, such as the CSMA protocol.

Accordingly, the technical solutions described herein facilitate addition of wireless communication channel for in-vehicle communication among multiple ECUs in the vehicle. The technical solutions described herein further facilitate message traffic over multiple communication physical layers. The technical solutions also describe techniques to optimize reliability, latency, and throughput of in-vehicle communication, by facilitating collision-free communication of inter-ECU messages via the wireless communication channel. The availability of the wireless communication channels increases flexibility of the electrical circuits within the vehicle, which are limited by the vehicle bus that is typically used for wired inter-ECU communication. Thus, the technical solutions described herein facilitate improved intra-vehicle communication and increase flexibility of the vehicle architecture.

The present technical solutions may comprise a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, such as example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may be executed, in fact, substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, ... and <N>" or "at least one of <A>, <B>, ... <N>, or combinations thereof" or "<A>, <B>, ... and/or <N>" are to be construed in the broadest sense, superseding any other implied definitions hereinbefore or hereinafter unless expressly asserted to the contrary, to mean one or more elements selected from the group comprising A, B, ... and N. In other words, the phrases mean any combination of one or more of the elements A, B, or N including any one element alone or the one element in combination with one or more of the other elements, which may also include, in combination, additional elements, not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device, accessible, or connectable thereto. Any application or module herein described may be implemented using computer readable/executable instructions that may be stored or otherwise held by such computer readable media.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A computer-implemented method for facilitating intra-vehicle wireless communication among a plurality of electronic control units, the method comprising:
   determining, by a first electronic control unit in a vehicle, a wait-time for a message, which is to be transmitted to a second electronic control unit in the vehicle via a wireless communication channel;
   executing, by the first electronic control unit, a first availability-check, which comprises determining availability of the wireless communication channel;
   after completion of the first availability-check, determining, based on the first availability-check, that the wireless communication channel is available;
   delaying transmission of the message by the wait-time;
   after passage of the wait-time, executing, by the first electronic control unit, a second availability-check to determine the availability of the wireless communication channel;
   determining, based on the second availability-check, that the wireless communication channel is still available; and
   performing the intra-vehicle wireless communication by transmitting the message from the first electronic control unit in the vehicle to the second electronic control unit in the vehicle,
   wherein the vehicle comprises a plurality of electronic control units, the first electronic control unit in the vehicle and the second electronic control unit being among the plurality of electronic control units, wherein each of the plurality of electronic control units is assigned a unique sequence number that is an integer ranging from 1 to $N_e$ where $N_e$ represents a total number of the plurality of electronic control units, and wherein the unique sequence number is assigned based on a role of the respective electronic control unit of the plurality of electronic control units, and
   wherein the wait-time is based on a priority-value of the message, and wherein the priority value of the message is based on the unique sequence number of the first electronic control unit and the unique sequence number of the second electronic control unit.

2. The computer-implemented method of claim 1, wherein the method further comprises, in response to the second availability-check indicating that the wireless communication channel is unavailable, incrementing a loop-counter and reporting the loop-counter to a vehicle communication unit of the first electronic control unit.

3. The computer-implemented method of claim 2, wherein the method further comprises, generating, by the vehicle communication unit, an instruction to change the wait-time of the message in response to the loop-counter crossing a predetermined threshold.

4. The computer-implemented method of claim 1, wherein the method further comprises:
   in response to the first availability-check indicating that the wireless communication channel is unavailable, incrementing a first loop-counter and reporting the first loop-counter to a vehicle communication unit of the first electronic control unit; and
   in response to the second availability-check indicating that the wireless communication channel is unavailable, incrementing a second loop-counter and reporting the second loop-counter to the vehicle communication unit of the first electronic control unit.

5. The computer-implemented method of claim 4, wherein the method further comprises, generating, by the vehicle communication unit, an instruction to change the wait-time of the message in response to the first loop-counter crossing a first predetermined threshold and the second loop-counter crossing a second predetermined threshold.

6. A first electronic control unit of a vehicle comprising:
   a memory;
   a wireless communication interface; and
   a processor coupled with the memory and the wireless communication interface, the processor configured to:
      determine a wait-time for a message, which is to be transmitted to a second electronic control unit in the vehicle via a wireless communication channel using the wireless communication interface;
      execute a first availability-check, which comprises determining availability of the wireless communication channel;
      after completion of the first availability-check, determine, based on the first availability-check, that the wireless communication channel is available;
      delay transmission of the message by the wait-time;
      after passage of the wait-time, execute a second availability-check to determine the availability of the wireless communication channel; and
      determine, based on the second availability-check, that the wireless communication channel is still available, and transmit the message for receipt by the second electronic control unit,
   wherein the vehicle comprises a plurality of electronic control units, the first electronic control unit in the vehicle and the second electronic control unit being among the plurality of electronic control units, wherein each of the plurality of electronic control units is assigned a unique sequence number that is an integer ranging from 1 to $N_e$ where $N_e$ represents a total number of the plurality of electronic control units, and wherein the unique sequence number is assigned based on a role of the respective electronic control unit of the plurality of electronic control units, and
   wherein the wait-time is based on a priority-value of the message, and wherein the priority value of the message is based on the unique sequence number of the first electronic control unit and the unique sequence number of the second electronic control unit.

7. The electronic control unit of claim 6, further comprising a vehicle communication unit, and wherein the processor is further configured to, in response to the second availability-check indicating that the wireless communication channel is unavailable, increment a loop-counter and report the loop-counter to the vehicle communication unit.

8. The electronic control unit of claim 7, wherein the processor is further configured to generate an instruction to change the wait-time of the message in response to the loop-counter crossing a predetermined threshold.

9. The electronic control unit of claim 6, further comprising a vehicle communication unit, and wherein the processor is further configured to:
  in response to the first availability-check indicating that the wireless communication channel is unavailable, increment a first loop-counter and report the first loop-counter to the vehicle communication unit; and
  in response to the second availability-check indicating that the wireless communication channel is unavailable, increment a second loop-counter and report the second loop-counter to the vehicle communication unit.

10. The electronic control unit of claim 9, wherein the processor is further configured to generate an instruction to change the wait-time of the message in response to the first loop-counter crossing a first predetermined threshold and the second loop-counter crossing a second predetermined threshold.

11. A computer program product for facilitating intra-vehicle wireless communication among a plurality of electronic control units in a vehicle, the computer program product comprising a non-transitory computer-readable memory, and the computer-readable memory including instructions to:
  determine a wait-time for a message, which is to be transmitted to a second electronic control unit in the vehicle via a wireless communication channel;
  execute a first availability-check, which comprises determining availability of the wireless communication channel;
  after completion of the first availability-check, determine, based on the first availability-check, that the wireless communication channel is available;
  delay transmission of the message by the wait-time;
  after passage of the wait-time, execute a second availability-check to determine the availability of the wireless communication channel;
  determine, based on the second availability-check, that the wireless communication channel is still available; and
  performing the intra-vehicle wireless communication by transmitting the message from a first electronic control unit in the vehicle to the second electronic control unit in the vehicle,
  wherein the vehicle comprises a plurality of electronic control units, the first electronic control unit in the vehicle and the second electronic control unit being among the plurality of electronic control units, wherein each of the plurality of electronic control units is assigned a unique sequence number that is an integer ranging from 1 to $N_e$ where $N_e$ represents a total number of the plurality of electronic control units, and wherein the unique sequence number is assigned based on a role of the respective electronic control unit of the plurality of electronic control units, and
  wherein the wait-time is based on a priority-value of the message, and wherein the priority value of the message is based on the unique sequence number of the first electronic control unit and the unique sequence number of the second electronic control unit.

12. The computer program product of claim 11, wherein the computer-readable memory further comprises instructions to in response to the second availability-check indicating that the wireless communication channel is unavailable, increment a loop-counter and report the loop-counter to a vehicle communication unit.

13. The computer program product of claim 12, wherein the computer-readable memory further comprises instructions to change the wait-time of the message in response to the loop-counter crossing a predetermined threshold.

14. The computer program product of claim 11, wherein the computer-readable memory further comprises instructions to:
  in response to the first availability-check indicating that the wireless communication channel is unavailable, increment a first loop-counter and report the first loop-counter to a vehicle communication unit; and
  in response to the second availability-check indicating that the wireless communication channel is unavailable, increment a second loop-counter and report the second loop-counter to the vehicle communication unit.

15. The computer program product of claim 14, wherein the computer-readable memory further comprises instructions to change the wait-time of the message in response to the first loop-counter crossing a first predetermined threshold and the second loop-counter crossing a second predetermined threshold.

* * * * *